United States Patent
McDowell

[19]

[11] Patent Number: 5,858,295
[45] Date of Patent: Jan. 12, 1999

[54] METHOD OF INJECTION MOLDING A PART USING AN INFLATABLE MOLD CORE

[75] Inventor: Christopher S. McDowell, Bridgewater, Mass.

[73] Assignee: Johnson & Johnson Professional, Inc., Raynham, Mass.

[21] Appl. No.: 775,092

[22] Filed: Dec. 30, 1996

[51] Int. Cl.⁶ .............................. B29C 45/26; B29C 45/44
[52] U.S. Cl. ...................... 264/314; 264/318; 264/328.1; 249/65
[58] Field of Search .................................. 264/314, 318, 264/328.1, 328.16, 313; 249/65

[56] References Cited

U.S. PATENT DOCUMENTS

| | | | |
|---|---|---|---|
| 3,610,563 | 10/1971 | Allen | 249/65 |
| 3,815,863 | 6/1974 | Andeweg | 264/314 |
| 3,932,088 | 1/1976 | Harada et al. | 249/65 |
| 4,022,862 | 5/1977 | McBride et al. | 264/313 |
| 4,212,621 | 7/1980 | Michelotti | 425/543 |
| 4,341,368 | 7/1982 | Thompson et al. | 249/142 |
| 4,808,360 | 2/1989 | Natori et al. | 264/221 |
| 4,863,771 | 9/1989 | Freeman | 264/314 |
| 4,911,876 | 3/1990 | Freeman | 264/314 |
| 4,925,151 | 5/1990 | Gray | 249/65 |
| 4,996,013 | 2/1991 | Hume | 264/86 |
| 5,087,193 | 2/1992 | Herbert, Jr. | 425/543 |
| 5,127,813 | 7/1992 | Omata et al. | 425/125 |
| 5,176,864 | 1/1993 | Bates et al. | 264/317 |
| 5,275,547 | 1/1994 | Brown | 425/129.1 |
| 5,425,628 | 6/1995 | Pinckney et al. | 425/389 |
| 5,558,895 | 9/1996 | Boyhan | 426/515 |

FOREIGN PATENT DOCUMENTS

| | | |
|---|---|---|
| 524333A1 | 1/1993 | European Pat. Off. |
| 2300278 | 7/1974 | Germany ................ 264/314 |
| 63-64713 | 3/1988 | Japan ..................... 264/314 |

*Primary Examiner*—Jill L. Heitbrink
*Attorney, Agent, or Firm*—Nutter, McClennen & Fish, LLP

[57] ABSTRACT

A method of injection molding includes the steps of providing a source of pressurized flowable material, a source of pressurized fluid, and a mold assembly actuatable from an open position to a closed position. The mold assembly includes first and second matable mold portions that define a substantially sealed cavity, an inflatable core member positioned within the substantially sealed cavity and secured to the first mold portion, a pressurized fluid path from the source of pressurized fluid through the first mold portion to the inflatable core member, and a flowable material path from the source of pressurized flowable material into the cavity. The pressurized fluid is introduced into the inflatable core member at a first pressure to provide an inflated core member that defines a core boundary and the pressurized flowable material is injected into a space defined by the cavity and the core boundary at a pressure less than the first pressure. After the flowable material transitions to a solid state, the pressurized fluid is removed from the inflated core member, the mold is opened, and the solid article is removed from the mold assembly.

9 Claims, 3 Drawing Sheets

METHOD OF INJECTION MOLDING A PART USING AN INFLATABLE MOLD CORE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

Injection molding is a process wherein a liquified or fluidized plastic is forced or injected under pressure into a closed mold. When the plastic solidifies it takes the shape of the mold cavity. The solid plastic shape is removed from the mold by opening the mold which is often comprised of two or more pieces and removing the solid plastic from the mold. Manufacturing advantages of the injection molding process include speed of production, minimal requirements for post-molding operations, and simultaneous multipart molding.

Although injection molding is well suited for making articles having intricate surface details, shapes having compound geometries and holes are more difficult to produce. Undercuts which include hollow regions beyond a solid surface region are especially difficult to create.

For example, it is known in the art to create intricate or undercut shapes by mating two or more separately molded components. This technique requires several steps and hand craftsmanship to assemble the parts. Depending on part size and shape, the potential for misalignment of the several pieces can be high. Another technique for forming undercut surfaces necessitates the use of multipart mold cores. In an exemplary procedure, a core having multiple parts is configured within a mold cavity to define a void or core within a part to be molded. After plastic is injected into the mold cavity and hardens around the multipart core, the core is reconfigured to allow the individual core components to be individually withdrawn from the cavity in the part through a passage narrower than the fully assembled core. The components must be reconfigured and individually withdrawn because the fully assembled core cannot be withdrawn from the part without damaging it. The larger the ratio of the undercut or void diameter with respect to the diameter of the passage leading from the void to the surface of the object, the more complex the multipart core must be. Once the ratio of void to passage becomes too large, a multipart mold is totally unsuitable if not impossible to use.

SUMMARY OF THE INVENTION

The present invention overcomes the disadvantages of molding techniques that rely on assembly of several finished parts to create a single part with an undercut surface, or of processes that require complex and unwieldy multipart mold cores. The method of the invention is elegantly simple, and adaptable to an expansive array of injection molding requirements. The method is particularly well suited to methods of molding patterns that are used to prepare castings of implantable articles such as joint prostheses.

In an exemplary embodiment a method of injection molding includes the steps of providing a source of pressurized flowable material, a source of pressurized fluid, and a mold assembly actuatable from an open position to a closed position. The mold assembly includes first and second matable mold portions that define a substantially sealed cavity. An inflatable core member, that defines a void and/or an undercut surface of a part, is positioned within the mold cavity. The inflatable core member is associated with the first mold portion, and the first mold portion includes a path for the pressurized fluid from the source of pressurized fluid through the first mold portion to the inflatable core member. A separate path is provided into the mold from the source of pressurized flowable material.

The pressurized fluid is introduced into the inflatable core member to provide an inflated core member that defines a core boundary. The pressure within the inflated core is maintained while the pressurized flowable material is injected into a space defined by the cavity and the core boundary.

After the flowable material transitions to a solid state, the pressurized fluid is removed from the inflated core member and the solid article is removed from the mold assembly. The inflatable core member can be filled with a fluid which cools the flowable material to reduce the time required to form the molded part.

BRIEF DESCRIPTION OF THE DRAWINGS

A more complete understanding of the present invention and the attendant advantages and features thereof will be more readily understood by reference to the is following detailed description when considered in conjunction with the accompanying drawings wherein.

DETAILED DESCRIPTION OF THE INVENTION

Figure 1:
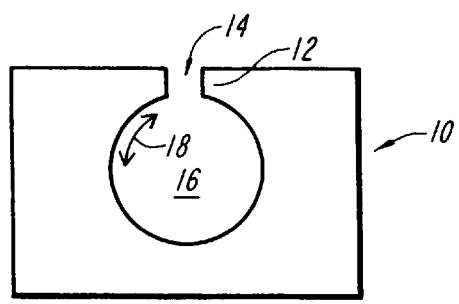
FIG. 1 is a cross-sectional view of a molded part.

FIG. 1 illustrates an exemplary part 10 that is manufacturable in accordance with the method of the present invention. The part 10 is not intended to represent a specific structure and the invention is not limited to making only the illustrated structure. Rather, the method of the invention of is useful for fabricating a full range of parts made by conventional injection molding techniques, as well as parts that cannot be made using conventional techniques. The method is particularly well suited to methods of molding patterns that are used to prepare castings of implantable articles such as joint prostheses.

The part 10 is shown in cross-section to facilitate further discussion of the method. As the inventive method is particularly well suited for making parts having undercuts, the part 10 is shown having a neck region 12 that defines a passage 14 leading to a void 16 that is wider than the passage. Portions of the part 10 where the void 16 is wider than the passage 14 are identified as undercut regions 18.

Figure 2:
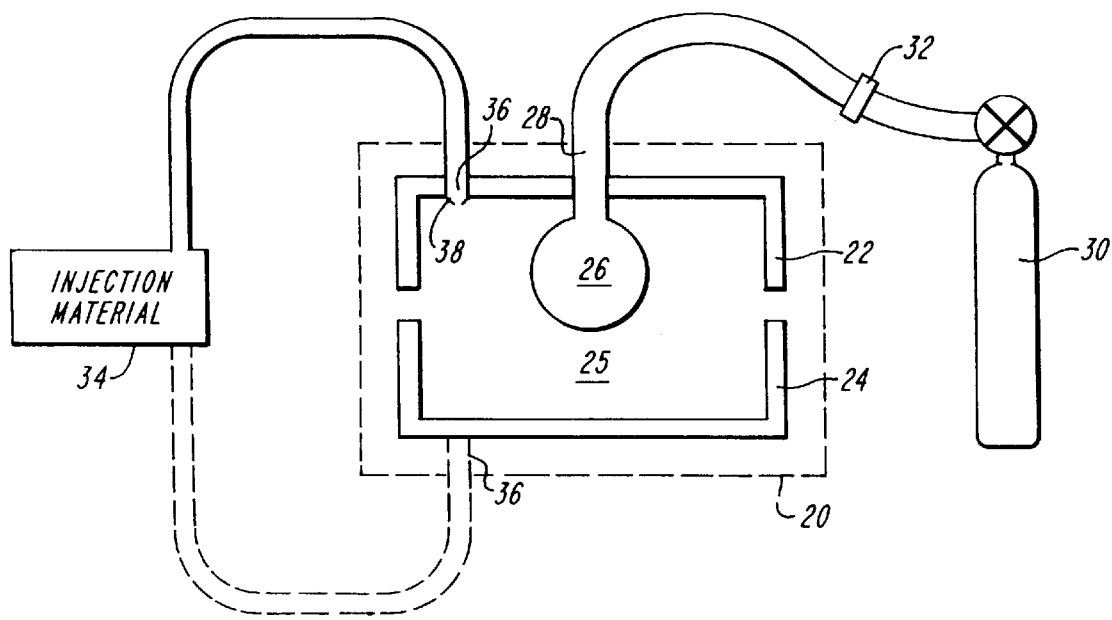
FIG. 2 is a schematic view of an exemplary system that is useful for making a molded part in accordance with the invention.

FIGS. 2 and 3A–3D illustrate an apparatus and the steps of a method for making a part having an undercut surface. Referring specifically to FIG. 2, a mold assembly 20 includes a first mold portion 22 and a second mold portion 24 that are releasably engagable with each other to define a substantially sealed cavity 25. The mold assembly 20 is actuatable from an open position that allows a molded part 10 to be removed from the mold cavity 25, to a closed position in preparation for injection of a flowable material such as molten wax or plastic. The mold portions 22 and 24 are held together and moved with respect to each other using apparatus known to those skilled in the art. By way of example, the mold portions 22 and 24 can be incorporated within an injection molding apparatus in a manner that one of ordinary skill in the art will readily appreciate.

As used herein, "substantially sealed" is intended to mean that the mold portions appear to be joined, but they are not joined in a fluid tight manner. Small scratches or gas vents permit gas, typically air, to escape from the mold cavity 25 when another material such as molten wax is injected into the cavity and displaces the air. Alternatively, the mold portions 22 and 24 can be engaged in a fluid tight manner and a valved vent can be provided to let air escape from the mold cavity 25 during the injection process. This too is to be considered "substantially sealed."

Continuing to refer to FIG. 2, an inflatable core member 26 is associated with the first mold portion 22. The inflatable core member 26 is selectably fillable with a fluid such as a liquid or a gas to expand the inflatable core member 26 to a predetermined size and shape. The inflatable core member 26 is preferably made of a substantially inelastic material, such as Mylar, or a filament reinforced rubber, that only has a single, predetermined, fully-inflated size and shape. When filled with fluid under pressure, the inflatable core member 26 provides a readily defined portion of the cavity wall of the first mold portion 22. Alternatively, the inflatable core member 26 can be viewed as defining a core boundary within the mold assembly 20. By contrast with the inflatable core member 26 of the invention, an elastic member or membrane such as a latex balloon has an indefinite inflation size and shape and would be unsuitable for the method of the invention.

The inflatable core member 26 is secured to the first mold portion 22 in fluid communication with a fluid passage 28 through the first mold portion. Thus, when the mold assembly 20 is opened and closed, the inflatable core member 26 moves (or remains stationary) with the first mold portion 22. The fluid passage 28 is in fluid communication with a pressurized fluid supply 30, such as a cylinder of compressed gas or a liquid under pressure. The fluid paths described herein can include tubes and associated fittings known to those skilled in the art.

As used herein, the "pressurized fluid supply" can further encompass a gas or liquid not always under pressure, but pressurizable by a liquid or gas pump 32. The fluid supply is valved in a manner known to those skilled in the art to permit fluid to be introduced into the inflatable core member 26 at a selected pressure or until a selected pressure is achieved. Similarly, the fluid supply is valved to permit the pressure to be reduced within the inflatable core member 26 and to permit the fluid to be voided from the inflatable core member. A vacuum can be created within the inflatable core member 26 to collapse it to the maximum extent possible to minimize its circumference.

Continuing to refer to FIG. 2 a supply of flowable material 34 is in fluid communication with a second fluid passage 36 in either or both of the first and the second mold portions 22 and 24, respectively. Association of an injection port 38 in one mold portion or the other is not of significant importance for the present method. The flowable material can be pressurized in a manner similar to the pressurized fluid supply 30 and in a manner know to those skilled in the art of injection molding.

Figure 3A:
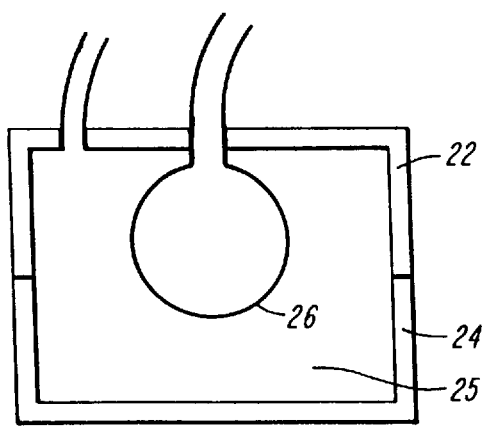
FIGS. 3A–3D are cross-sectional views of a mold assembly and a part at various stages of fabrication by a method in accordance with the present invention.
Figure 3B:
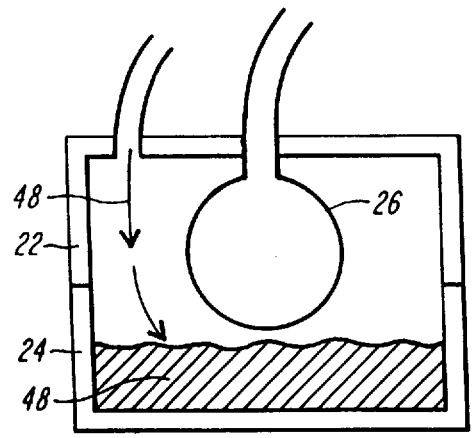
Figure 3C:
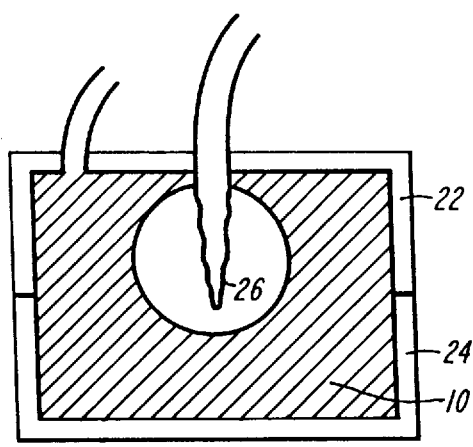
Figure 3D:
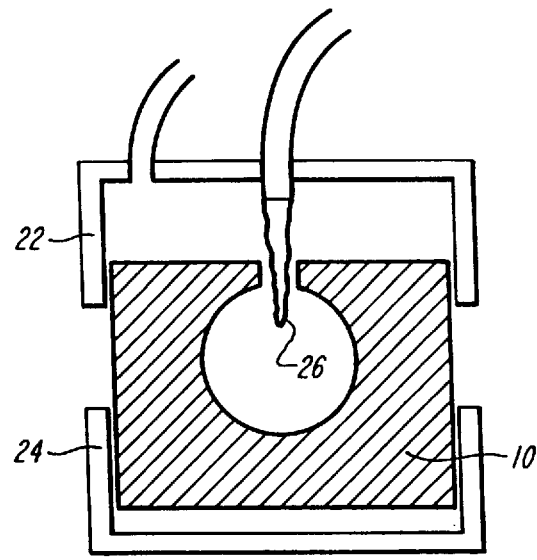
Figure 4:
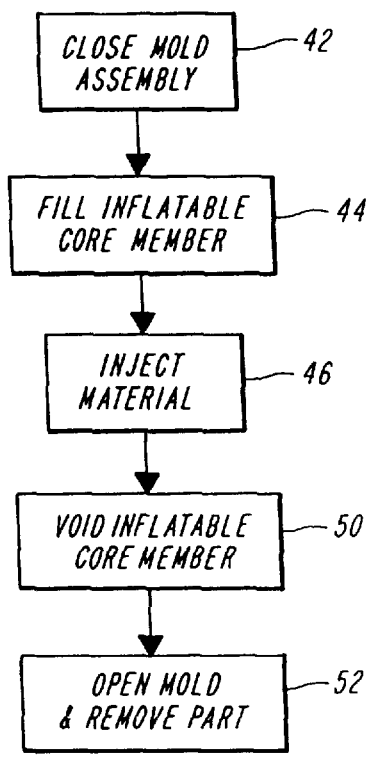
FIG. 4 is a flow diagram of steps of the method illustrated in FIGS. 3A–3D.

FIG. 4 is a flow diagram of method steps illustrated in FIGS. 3A–3D, wherein initial steps of providing a source of pressurized flowable material, providing a source of pressurized fluid, and providing a mold assembly have been discussed above. The method continues by placing the mold assembly 20 in a closed state as shown in FIG. 3A to define a substantially closed cavity 25 in a step 42. Next, in a step 44, pressurized fluid is introduced into the inflatable core member 26 at a first pressure to fill the inflatable core member and to thereby define a core boundary. Pressure is maintained actively or passively within the inflatable core member 26. Although the inflatable core member 26 is depicted as being substantially spherical in an inflated state, the shape of the inflatable member can be any shape assumable by an inflated plenum and can include compound curves, as well as angled and planar surfaces.

FIG. 3B illustrates a step 46 of injecting a flowable material 48 into the cavity 25 at a second pressure. The second pressure is less than the first pressure so that the inflatable core member 26 is not deformed by the flowable material during or after the injection step 46. The flowable material 48 is allowed or caused to transition to a solid state, thereby defining a part 10. For example, molten wax is cooled to cause it to harden. In an optional step, the pressurized fluid that inflates the inflatable core member 26 can be chilled to a temperature below or well below that of the flowable material 48 to reduce the time required to harden it. Any known method of cooling a fluid is acceptable and is not a limitation of the invention.

After the flowable material 48 has hardened or assumed a solid shape, the inflatable core member 26 is deflated or voided in a step 50, as shown in FIG. 3C. Significantly, the inflatable core member 26 can be deflated to such an extent that it has a circumference smaller than the undercut region 18 of the part 10. Even if the neck region 12 of the part 10 is very narrow and the undercut region very large, the reduced diameter and suppleness of the inflatable core member 26 permit the part 10 to be pulled away from the first mold portion 22 and the inflatable core member 26 without damaging the undercut region 18 or the neck region 12 of the part when the mold assembly 20 is opened and the molded part 10 is removed from the mold in a step 52, as shown in FIG. 3D.

A variety of modifications and variations of the present invention are possible in light of the above teachings. It is therefore understood that, within the scope of the appended claims, the present invention may be practiced otherwise than as specifically described hereinabove. All references cited herein are expressly incorporated by reference in their entirety.

What is claimed is:

1. A method of injection molding a part having an undercut surface portion, comprising the steps of:
   providing a source of pressurized flowable material;
   providing a source of pressurized fluid;
   providing a reusable mold assembly actuatable from an open position to a closed position, the mold assembly including a first mold portion, a second mold portion matable with the first mold portion to define a substantially sealed cavity, a substantially inelastic, supple core member positioned within the substantially sealed cavity and secured to the first mold portion, a pressurized fluid path from the source of pressurized fluid through the first mold portion to the inflatable core member, and a flowable material path from the source of pressurized flowable material into the cavity;

introducing the pressurized fluid into the inflatable core member at a first pressure to provide an inflated core member that defines a core boundary;

maintaining the first pressure within the inflated core;

injecting the pressurized flowable material into a space defined by the cavity and the core boundary at a second pressure, the second pressure being less than the first pressure;

causing the flowable material to transition to a solid state, thereby defining a part;

removing the pressurized fluid from the inflated core member; and removing the part from the mold assembly.

2. The method of claim 1, wherein the step of providing a source of pressurized flowable material comprises the step of providing a material selected from the group consisting of wax and plastic.

3. The method of claim 1, wherein the step of providing a source of pressurized fluid comprises the step of providing a pressurized gas.

4. The method of claim 1, wherein the step of providing a source of pressurized fluid comprises the step of providing a liquid under pressure.

5. The method of claim 1, wherein the step of providing a mold assembly includes the step of providing the first mold with the flowable material path from the source of pressurized flowable material into the cavity.

6. The method of claim 1, wherein the step of providing a mold assembly includes the step of providing the second mold portion with the flowable material path from the source of pressurized flowable material into the cavity.

7. The method of claim 1, further comprising the step of cooling the pressurized fluid to a temperature less than a temperature of the pressurized flowable material.

8. The method of claim 1, wherein the step of removing the part from the mold assembly includes the steps of opening the mold and moving the part away from the first mold portion.

9. A method of injection molding a part having an undercut surface portion, comprising the steps of:

providing a source of molten wax;

providing a source of pressurized gas;

providing a reusable mold assembly actuatable from an open position to a closed position, the mold assembly including a first mold portion, a second mold portion matable with the first mold portion to define a substantially sealed cavity, an inflatable, supple, inelastic core member positioned within the substantially sealed cavity and secured to the first mold portion, a path from the source of pressurized gas through the first mold portion to the inflatable, inelastic core member, and a path from the source of molten wax into the cavity;

introducing the pressurized gas into the inflatable core member at a first pressure and temperature to provide an inflated core member that defines a core boundary;

maintaining the first pressure and temperature within the inflated core;

injecting the molten wax under pressure into a space defined by the cavity and the core boundary at a second pressure and temperature, the second pressure being less than the first pressure, and the second temperature being greater than the first temperature;

allowing the wax to harden, thereby defining a part;

aspirating the pressurized gas from the inflated, inelastic core member;

opening the mold; and removing the part from the mold assembly.

* * * * *